US 7,210,413 B2

(12) United States Patent
Barry et al.

(10) Patent No.: US 7,210,413 B2
(45) Date of Patent: May 1, 2007

(54) UNIVERSAL BOXCAR

(75) Inventors: Robert J. Barry, Arlington, TX (US); Guy W. Steeves, Keller, TX (US); George S. Creighton, Flower Mound, TX (US); D. Bruce Fetterman, Arlington, TX (US)

(73) Assignee: TRN Business Trust, Dallas, TX (US)

( * ) Notice: Subject to any disclaimer, the term of this patent is extended or adjusted under 35 U.S.C. 154(b) by 99 days.

(21) Appl. No.: 10/960,221

(22) Filed: Oct. 7, 2004

(65) Prior Publication Data

US 2005/0087095 A1    Apr. 28, 2005

Related U.S. Application Data

(60) Provisional application No. 60/509,935, filed on Oct. 9, 2003.

(51) Int. Cl.
*B61D 17/00* (2006.01)
(52) U.S. Cl. .................. 105/404; 105/409; 105/355; 105/423
(58) Field of Classification Search ............... 105/423, 105/355, 404, 409; 410/77, 79, 78, 81, 82, 410/89, 90, 91, 101, 102, 116, 104, 115, 105, 410/130, 132, 139, 141, 142, 144, 150, 152
See application file for complete search history.

(56) References Cited

U.S. PATENT DOCUMENTS

| 215,625 | A | 5/1879 | Jauriet ........................ 62/423 |
|---|---|---|---|
| 1,085,058 | A | 1/1914 | Messick |
| 1,092,659 | A | 4/1914 | Mettler |
| 1,212,043 | A | 1/1917 | Freeman et al. |
| 1,284,111 | A | 11/1918 | Kestler |
| 1,330,361 | A | 2/1920 | Todd |
| 1,494,579 | A | 2/1924 | Bohn ........................ 49/489.1 |
| 1,801,564 | A | 4/1931 | Muffly .................. 220/592.07 |
| 2,011,155 | A | 8/1935 | Neikirk ....................... 105/415 |
| 2,047,133 | A | 7/1936 | Christianson et al. ....... 105/409 |
| 2,169,692 | A | 5/1939 | Hansen |
| 2,269,631 | A | 1/1942 | Marinello .............. 105/377.09 |
| 2,605,064 | A | 7/1952 | Davis ........................ 244/118 |

(Continued)

FOREIGN PATENT DOCUMENTS

GB        J07564 A      3/1910

OTHER PUBLICATIONS

Equipment Diagram for Unrestricted Interchange Service Standard, Association of American Railroads, Plate F, Apr. 1, 1976.*

(Continued)

*Primary Examiner*—Mark T. Le
(74) *Attorney, Agent, or Firm*—Baker Botts L.L.P.

(57) ABSTRACT

A universal boxcar is provided with load carrying capabilities of a conventional uninsulated boxcar and temperature ratings of an insulated boxcar. The insulated boxcar may be formed with interior dimensions corresponding generally with interior dimensions of an uninsulated boxcar without requiring the use of high cost, high performance insulation. The insulated boxcar may be formed at a reasonable cost and selling price with increased load carrying capacity, increased service life, and reduced maintenance costs as compared to conventional insulated boxcars.

16 Claims, 9 Drawing Sheets

U.S. PATENT DOCUMENTS

| | | | |
|---|---|---|---|
| 2,716,383 A | 8/1955 | Johnson | 410/112 |
| 2,756,693 A | 7/1956 | Forsl | 105/369 |
| 2,888,883 A | 6/1959 | Fritz et al. | 105/250 |
| 3,137,247 A | 6/1964 | Hamilton et al. | 105/251 |
| 3,179,068 A | 4/1965 | Jensen | 105/369 |
| 3,288,531 A | 11/1966 | Bartsch | |
| 3,343,725 A | 9/1967 | Cannon | 122/129 |
| 3,408,956 A | 11/1968 | Rebenok et al. | 105/240 |
| 3,434,433 A | 3/1969 | Floehr | 105/249 |
| 3,455,253 A | 7/1969 | Floehr | 105/251 |
| 3,468,062 A | 9/1969 | Hennessy | 49/362 |
| 3,468,063 A | 9/1969 | Hennessy | 49/362 |
| 3,501,030 A | 3/1970 | Flink | 214/17 |
| 3,581,672 A | 6/1971 | Aquino | 105/240 |
| 3,601,453 A | 8/1971 | Silverman | 303/89 |
| 3,624,761 A | 11/1971 | Kohn | 180/112 |
| 3,626,865 A | 12/1971 | Aquino et al. | 105/240 |
| 3,636,658 A | 1/1972 | Bollinger, Sr. | 49/362 |
| 3,656,437 A | 4/1972 | Kuzmicki | 105/240 |
| 3,683,552 A | 8/1972 | Bollinger, Sr. | 49/209 |
| 3,746,388 A | 7/1973 | Robinson | 296/181.6 |
| 3,762,341 A | 10/1973 | Adler | 410/103 |
| 3,789,772 A | 2/1974 | Bullard | 105/240 |
| 3,796,007 A | 3/1974 | Bollinger, Sr. et al. | 49/362 |
| 3,800,711 A | 4/1974 | Tuttle | 105/251 |
| 3,802,356 A | 4/1974 | Hasselof et al. | 105/376 |
| 3,837,296 A | 9/1974 | Loomis | 105/376 |
| 3,843,081 A | 10/1974 | Meier et al. | 248/223 |
| 3,883,992 A | 5/1975 | Bollinger, Sr. | 49/362 |
| 3,917,338 A | 11/1975 | Becker | 410/116 |
| 3,923,327 A | 12/1975 | Ross, Jr. | 292/39 |
| 3,949,681 A | 4/1976 | Miller | 105/284 |
| 3,965,760 A | 6/1976 | Etheredge, Jr. | 74/89.14 |
| 3,990,184 A | 11/1976 | Bollinger, Sr. | 49/218 |
| 3,996,591 A | 12/1976 | Hayward | 343/225 |
| 4,021,066 A | 5/1977 | McShane | 292/144 |
| 4,114,318 A | 9/1978 | Brindle | 49/215 |
| 4,136,621 A | 1/1979 | Schuller et al. | 105/308 |
| 4,138,948 A | 2/1979 | Korolis | 105/251 |
| 4,145,080 A | 3/1979 | Miller et al. | 296/24.35 |
| 4,167,144 A | 9/1979 | Martin et al. | 105/467 |
| 4,168,667 A | 9/1979 | Loomis | 105/467 |
| 4,227,732 A | 10/1980 | Kish | 294/71 |
| 4,235,169 A | 11/1980 | Peterson | 105/251 |
| 4,246,849 A | 1/1981 | Gramse | 105/251 |
| 4,250,814 A | 2/1981 | Stark et al. | 105/251 |
| 4,262,601 A | 4/1981 | Miller | 105/241.2 |
| 4,342,267 A | 8/1982 | Blout | 105/282 |
| 4,400,914 A | 8/1983 | Hennessy | 49/362 |
| 4,417,526 A | 11/1983 | Marulic et al. | 105/406.1 |
| 4,450,773 A | 5/1984 | Fritz et al. | 105/282 |
| 4,491,354 A | 1/1985 | Williams | 292/148 |
| 4,580,502 A | 4/1986 | Ritzl et al. | 105/240 |
| 4,601,244 A | 7/1986 | Fischer | 105/240 |
| 4,766,820 A | 8/1988 | Ritter et al. | 105/240 |
| 4,829,908 A | 5/1989 | Hallam | 105/240 |
| 4,930,427 A | 6/1990 | Ritter et al. | 105/406.1 |
| 4,986,590 A | 1/1991 | Patti et al. | 296/39.2 |
| 5,077,459 A | 12/1991 | Heumiller | 219/117.1 |
| 5,115,748 A | 5/1992 | Westlake | 105/286 |
| 5,144,895 A | 9/1992 | Murray | 105/286 |
| 5,163,372 A | 11/1992 | Galvan et al. | 105/240 |
| 5,177,988 A | 1/1993 | Bushnell | 70/279 |
| 5,261,333 A | 11/1993 | Miller | 105/287 |
| 5,263,422 A | 11/1993 | Barefoot | 105/308.1 |
| 5,351,582 A | 10/1994 | Snyder et al. | 81/57.17 |
| 5,562,989 A | 10/1996 | Statz | 428/402 |
| 5,713,974 A * | 2/1998 | Martin et al. | 65/17.2 |
| 5,765,485 A | 6/1998 | Thoman et al. | 105/404 |
| 5,802,984 A | 9/1998 | Thoman et al. | 105/404 |
| 5,868,045 A | 2/1999 | Hauk | 81/57.34 |
| 5,890,435 A | 4/1999 | Thoman et al. | 105/404 |
| 6,019,049 A | 2/2000 | Gaydos et al. | 105/289 |
| 6,092,472 A | 7/2000 | Thoman et al. | 105/404 |
| 6,109,844 A | 8/2000 | Nadherny et al. | 410/34 |
| 6,112,671 A | 9/2000 | Basile et al. | 105/422 |
| 6,116,118 A | 9/2000 | Wesch, Jr. | 81/57.34 |
| 6,138,529 A | 10/2000 | Pietras | 81/57.33 |
| 6,138,580 A | 10/2000 | Thoman | 105/396 |
| 6,186,563 B1 | 2/2001 | Kruzick et al. | 292/201 |
| 6,270,600 B1 | 8/2001 | Wycech | 156/79 |
| 6,279,487 B1 | 8/2001 | Gaydos et al. | 105/289 |
| 6,315,509 B1 | 11/2001 | Nadherny et al. | 410/116 |
| 6,367,391 B1 | 4/2002 | Thoman et al. | 105/404 |
| 6,374,546 B1 | 4/2002 | Fecko et al. | 52/17 |
| 6,402,446 B1 | 6/2002 | Nadherny et al. | 410/100 |
| 6,422,794 B1 | 7/2002 | Zhan et al. | 410/100 |
| 6,450,105 B1 | 9/2002 | Glass | 105/404 |
| 6,481,941 B2 | 11/2002 | Nadherny et al. | 410/114 |
| 6,494,651 B1 | 12/2002 | Zhan et al. | 410/116 |
| 6,575,102 B2 | 6/2003 | Norton et al. | 105/423 |
| 6,585,466 B2 | 7/2003 | Zhan et al. | 410/116 |
| 6,858,466 B1 | 7/2003 | Zhan et al. | 410/116 |
| 6,609,583 B2 | 8/2003 | Schillaci et al. | 180/69.21 |
| 6,615,741 B2 | 9/2003 | Fecko et al. | 105/404 |
| 6,626,623 B2 | 9/2003 | DeLay | 410/116 |
| 6,655,886 B2 | 12/2003 | Grandy | 410/112 |
| 6,709,209 B2 | 3/2004 | Zhan et al. | 410/116 |
| 6,712,568 B2 | 3/2004 | Snyder et al. | 410/104 |
| 6,722,287 B2 | 4/2004 | Norton et al. | 105/404 |
| 6,748,841 B1 | 6/2004 | Fritz | 87/57.41 |
| 6,761,840 B2 | 7/2004 | Fecko et al. | 52/17 |
| 2002/0046678 A1 | 4/2002 | Fecko et al. | 105/404 |
| 2002/0148381 A1 | 10/2002 | Norton et al. | 105/355 |
| 2002/0157565 A1 | 10/2002 | Norton et al. | 105/404 |
| 2002/0170238 A1 | 11/2002 | Fecko et al. | 52/17 |
| 2006/0065152 A1 | 3/2006 | Heitmeyer et al. | 105/404 |

OTHER PUBLICATIONS

"IRECO Boxcar Lading Tie Anchor" at http://www/ireco.com/BoxcarLadingAnchors2761_3648.htm, 2 pgs, Printed Dec. 15, 2003.

"What is Vacuum Insulation?Vacuum Insulation (VI) Explained . . . ", at http://www.estglobal.com/tech-vip.html, 2 pages, Printed Oct. 5, 2004.

Equipment Diagram for Unrestricted Interchange Service Standard, Association Of American Railroads, Plate F, Apr. 1, 1978.

PCT International Search, PCT US2004/027519, 8 pages.

PCT International Search, PCT US2004/027508, 12 pages.

Invitation to Pay Additional Fees; PCT/US2004/027508; 6 pages.

Notification of Transmittal of The International Search Report and The Written Opinion of the International Searching Authority for PCT/US2004/027519; 14 pages.

Notification of Transmittal of The International Search Report and The Written Opinion of the International Searching Authority for PCT/US2004/027508; 19 pages, Feb. 16, 2005.

* cited by examiner

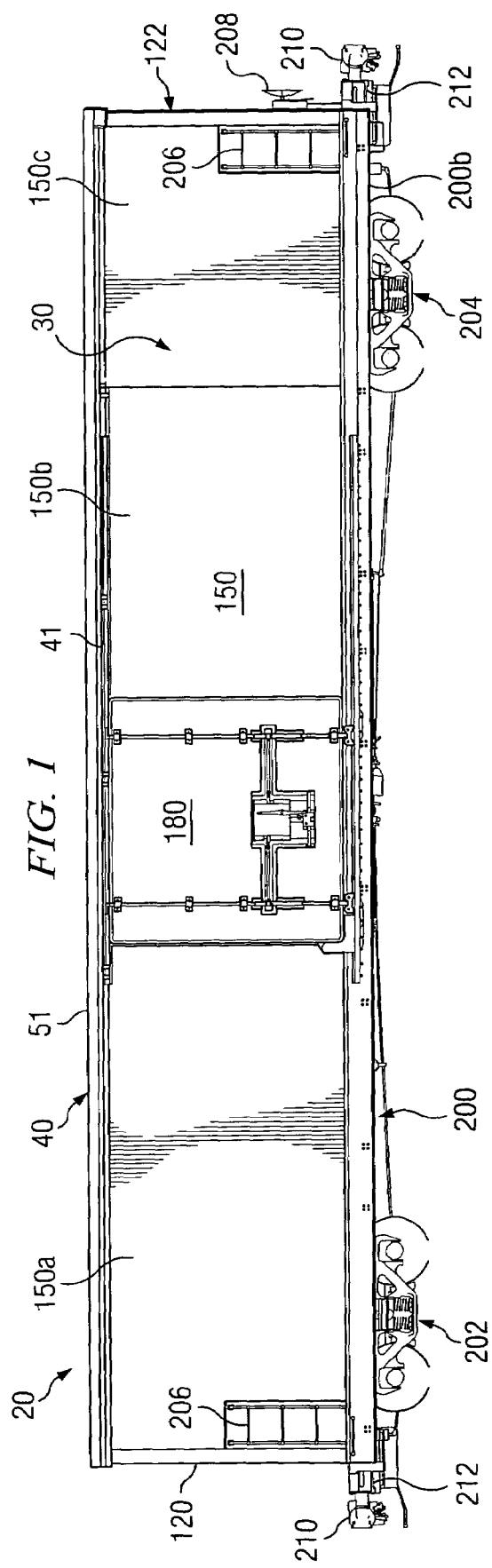
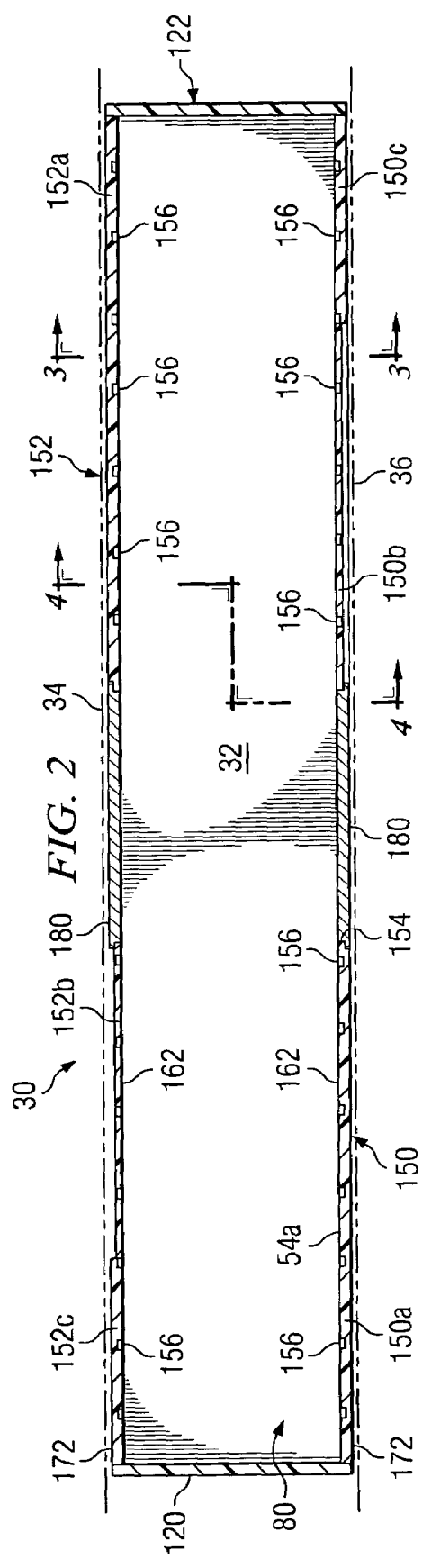

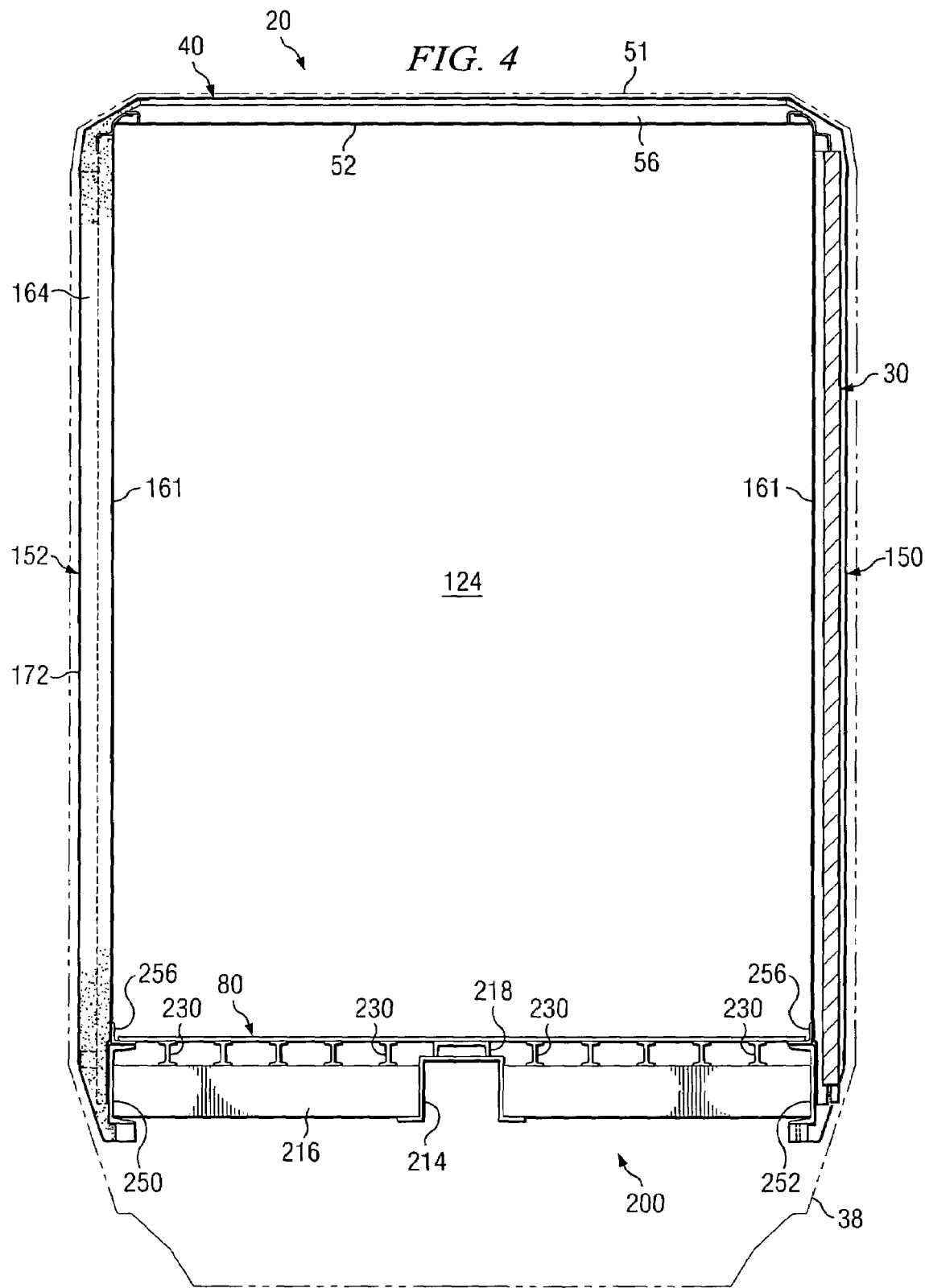

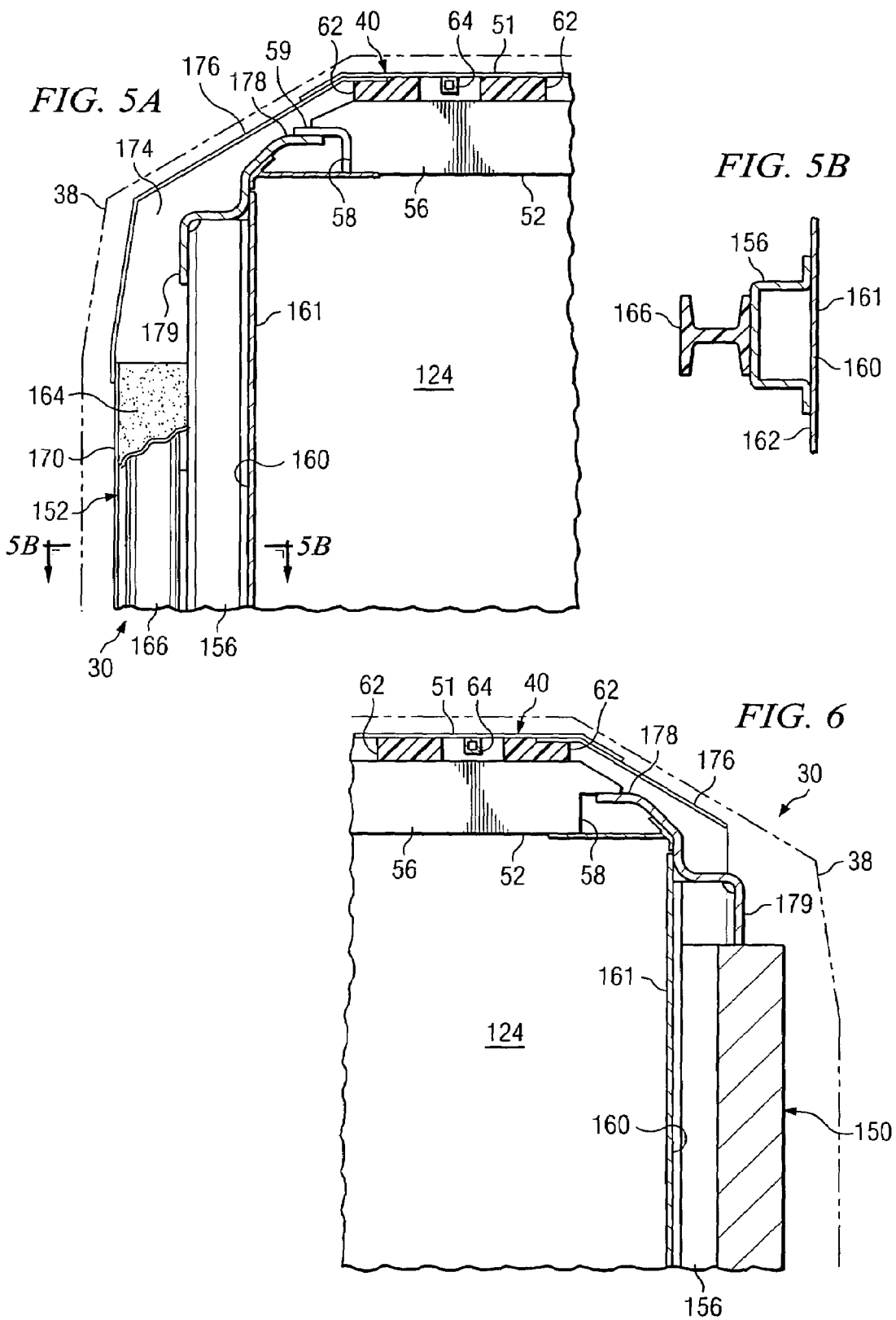

UNIVERSAL BOXCAR

RELATED APPLICATION

This application claims the benefit of U.S. provisional patent application entitled, "Universal Boxcar", Application Ser. No. 60/509,935 filed Oct. 9, 2003.

This application is related to patent application entitled "Ceramic/Epoxy Insulated Railway Car", application Ser. No. 10/682,001, Filed, Oct. 9, 2003; now abandoned patent application entitled, "Boxcar With Load Restraint System", application Ser. No. 10/782,138, filed Feb. 19, 2004, now U.S. Pat. No. 7,004,080, which claims priority from U.S. provisional patent application 60/509,935 filed Oct. 9, 2003 and copending patent application entitled "Universal Boxcar With Exterior Metal Surfaces", application Ser. No. 10/960,243 filed, Oct. 7, 2004 which claims priority from U.S. provisional patent application 60/509,935 filed Oct. 9, 2003.

TECHNICAL FIELD

The present invention is related to railway cars and more particularly to insulated boxcars which satisfy applicable AAR requirements for UA factor (heat transfer) and have load carrying capabilities equal to or better than uninsulated boxcars with the same AAR clearance plate.

BACKGROUND OF THE INVENTION

Over the years general purpose boxcars have progressed from relatively simple wooden structures mounted on flat cars to more elaborate arrangements including insulated walls and refrigeration equipment. Various types of insulated and uninsulated boxcars are presently manufactured and used. A typical boxcar includes an enclosed structure mounted on a railway car underframe. The enclosed structure generally includes a floor assembly, a pair of sidewalls, a pair of endwalls and a roof assembly. Insulated boxcars often include sidewalls, endwalls and a roof formed in part by an outer shell, one or more layers of insulation and an interior surface.

The outer shell of many boxcars may be formed from various types of metal such as steel or aluminum. The interior surfaces may be formed from wood and/or metal as desired for specific applications. For some applications the interior surfaces may be formed from fiber reinforced plastic (FRP). Various types of sliding doors including plug type doors are generally provided on each side of a boxcar for loading and unloading freight.

The underframe for many boxcars includes a center sill with a pair of end sill assemblies and a pair of side sill assemblies arranged in a generally rectangular configuration corresponding approximately with dimensions of the floor assembly of the boxcar. Cross bearers and/or cross ties may be provided to establish desired rigidity and strength for transmission of vertical loads from the floor assembly to associated side sills which in turn transmit the vertical loads from the floor assembly to associated body bolsters and for distributing horizontal end loads on the center sill to other portions of the underframe. Cross bearers and cross ties generally cooperate with each other to support a plurality of longitudinal stringers. The longitudinal stringers are often provided on each side of the center sill to support the floor assembly of a boxcar.

Applicable standards of the Association of American Railroads (AAR) established maximum total weight on rail for any railway car including boxcars, freight cars, hopper cars, gondola cars, and temperature controlled railway cars within prescribed limits of length, width, height, etc. All railway cars operating on commercial rail lines in the U.S. must have exterior dimensions which satisfy associated AAR clearance plates. Therefore, the maximum load which may be carried by any railway car is typically limited by the applicable AAR clearance plate and empty weight of the railway car.

Reducing the empty weight of a railway car or increasing interior dimensions may increase both volumetric capacity and maximum load capacity of a railway car while still meeting applicable AAR standards for total weight on rail and exterior dimensions for applicable AAR clearance plate. Traditionally, insulated boxcars have less inside height and width than desired for cost effective shipment of some types of lading. The maximum exterior width of an insulated boxcar is limited by applicable AAR clearance plates. The maximum interior width is limited by the amount (thickness) of insulation required to satisfy applicable AAR heat transfer limitations or UA factor. Door operating tubes, door bottom tracks and door handles are often built to the extreme width of applicable AAR plate diagrams. Locating door assembly components at the maximum width provides as much interior width as possible for carrying lading within an insulated boxcar or uninsulated boxcar. Door assembly components for many conventional insulated boxcars may extend approximately four inches (4") from each ride of the boxcar. Therefore, interior dimensions of such boxcars are also limited by the four inch extension of the associated door assemblies.

Conventional insulated boxcars may have an inside width of nine feet or less while many uninsulated boxcars often have an inside width of approximately nine feet, six inches. Prior insulated boxcars have been relatively ineffective at increasing interior volumetric capacity while maintaining desired UA rating or minimum insulation efficiency required by AAR. UA may be generally described as the number of BTU's per hour per degree Farenheit which transfer through the roof assembly, sidewall assemblies, endwall assemblies and/or floor assembly of an insulated boxcar.

At least one insulated boxcar has been built with a nominal length of fifty two feet six inches (52' 6") and an interior width of approximately nine feet six inches (9'6"). This particular insulated boxcar had a UA factor of 285 BTU/° F./hour which is greater than applicable AAR requirements. AAR specifications place various requirements on insulated boxcars such as sidewalls, endwalls, floor and roof having a maximum UA factor of 250 BTU/° F./hour for a fifty foot boxcar and a maximum UA factor of 300 BTU/° F./hour for a sixty foot boxcar.

Tie down assemblies and cargo anchors are typically located in the floor for many types of boxcars. Some types of lading such as paper products may be damaged by conventional tie down assemblies and anchors in the floor of a boxcar. Also, conventional tie down assemblies and cargo anchors located in the floor of a boxcar may cause problems with cleaning the interior of the boxcar. Some types of lading such as food products have specific requirements for cleaning the interior of a boxcar prior to loading. Water from cleaning or condensation may collect in floor located tie down assemblies and cargo anchors resulting corrosion and increased maintenance costs. The water may also damage paper products, food and other types of lading.

Typically, conventional boxcars (both insulated and uninsulated) include a pair of sidewall assemblies with substantially the same configuration and dimensions. Such conventional sidewall assemblies generally have approximately the same wall thickness over the length and width of each sidewall assembly. Typically the only change in sidewall thickness occurs at respective openings formed in each conventional sidewall assembly to provide access for loading and unloading of cargo. Sidewall assemblies associated with conventional insulated boxcars often have approximately the same UA factor or heat transfer rating over the length and width of each sidewall assembly.

SUMMARY OF THE INVENTION

In accordance with teachings of the present invention, several disadvantages and problems associated with both insulated and uninsulated boxcars and other types of railway cars have been substantially reduced or eliminated. One embodiment of the present invention includes a dual use or universal boxcar which may satisfactorily carry temperature controlled lading or nontemperature controlled lading. The present invention provides a universal boxcar capable of transporting a wide variety of freight, including frozen products and fresh products which require temperature control and dry food, non-food products and paper products which do not require temperature control.

An insulated boxcar incorporating teaching of the present invention may provide the load carrying capacity of a conventional uninsulated boxcar and have substantially the same UA factor or heat transfer rating as a conventional insulated boxcar. A universal boxcar incorporating teachings of the present invention may have the same load pattern and load storage capability as a corresponding uninsulated boxcar. The present invention allows maximizing the interior height width of an insulated boxcar while satisfying applicable AAR heat transfer ratings.

One aspect of the present invention includes providing an insulated boxcar with steel interior surfaces satisfactory for carrying lading such as coiled steel, lumber, beer, wine, any other liquid filled containers, newsprint, paper rolls, automobile parts, household appliances, electronic equipment, canned food products and/or packaged food products (both perishable and non-perishable). For some applications the interior surfaces may be coated with ceramic/epoxy insulating materials having a plurality of microspheres. Ceramic bead infused epoxy coatings are one example of such insulating materials.

The present invention allows designing sidewall assemblies and endwall assemblies with reasonably priced insulating materials having optimum thickness to minimize heat transfer rates (UA factor) between the interior and the exterior of the sidewall assemblies and endwall assemblies while maximizing interior load carrying capacity. For some applications, insulators may be disposed between selected components of each sidewall assembly and associated side sill to satisfy applicable heat transfer ratings. Structural integrity of an insulated boxcar may be maintained using conventional materials such as steel alloys or aluminum alloys to form interior portions and supporting structures of the sidewall assemblies and endwall assemblies. An exterior shell of fiber reinforced plastic or other suitable, lightweight materials may be used to reduce empty car weight of the boxcar. The present invention provides an insulated boxcar with increased insulation efficiency and satisfactory heat transfer rates without the use of expensive, exotic insulation materials and at the same time satisfying all applicable AAR specifications.

The present invention allows tie down assemblies and anchors associated with many conventional boxcars to be removed from the floor to improve heat transfer characteristics. Tie down assemblies and anchors may be attached to or formed as components of structural members associated with each sidewall assembly in accordance with teachings of the present invention. Placing anchors and tie down assemblies in adjacent sidewall assemblies allows improved cleaning of an associated floor and provides a generally smooth floor surface satisfactory for carrying lading such as paper rolls or any other lading which may be damaged by conventional tie down assemblies and anchors located in a floor.

Technical benefits of the present invention include placing cargo anchors or tie down assemblies in adjacent sidewall assemblies to prevent retention of water from condensation or wash out during cleaning from being retained within the anchors or tie down assemblies. Conventional anchors or tie down assemblies which are placed in the floor of a conventional boxcar often rust and prematurely fail as a result of corrosion associated with water retained within the respective cargo anchor or tie down assemblies. Also, moisture trapped in conventional cargo anchors or tie down assemblies located in the floor of a boxcar may damage or contaminate commodities such as paper and food products.

Tie down assemblies and cargo anchors attached to a sidewall assembly in accordance with teachings of the present invention may have substantially increased load carrying capacity as compared with prior sidewall tie down assemblies or anchors. For example floor anchors associated with conventional boxcars may be used to restrain loads weighing thirty thousand pounds (30,000 lbs.). Conventional sidewall anchors are often not able to support this much load. Tie down assemblies and cargo anchors formed in accordance with teachings of the present invention may be used to satisfactorily restrain thirty thousand pound steel coils while eliminating or reducing potential risk of corrosion and maintaining desired thermal efficiency.

Further technical benefits of the present invention include providing a double seal assembly for doors associated with insulated boxcars. The use of a double seal assembly between a door and an adjacent frame assembly substantially reduces heat transfer when the door is in its closed position. Conventional insulated boxcars often include a single door seal gasket. When a single seal gasket becomes worn or torn, air may communicate through the damaged seal resulting in heat transfer rates greater than allowed by AAR specifications. A second seal formed in accordance with teachings of the present invention improves the life and durability of the door seal system and provides an added thermal barrier by trapping air between the first seal and the second seal. The second seal may have various configurations shapes such as a "shark tooth" shape, round shape or other conventional seal shapes. The second seal may be mounted all around the entire perimeter of the door or parallel with the existing first door gasket seal. A double seal assembly formed in accordance with teachings of the present invention provides improved insulation as well as a redundant seal in the event of failure of one of the seal mechanisms.

Technical benefits of the present invention include providing an insulated boxcar having an increased interior height and width while maintaining maximum height and exterior width of the boxcar within limits prescribed by the American Association of Railroads. Sidewalls and endwalls may be formed in accordance with teachings of the present invention using insulation materials which provide desired thermal heat transfer characteristics at a reasonable cost. For some application, extra urethane foam insulation may be added by increasing sidewall thickness in areas where an associated door assembly does not operate.

Door operating tubes, handles and the bottom of the door track are preferably built to the maximum width for a boxcar in accordance with applicable AAR specifications to provide the maximum available interior width for load carrying capability. The door and door track area is often cover approximately forty percent of the exterior surface of each sidewall assembly. To meet AAR heat transfer requirements, the thickness of selected portions of each sidewall assembly may be increased to the maximum allowed AAR width of the associated boxcar. The thickness of insulation may be substantially increased in any portion of a sidewall assembly which is not associated with operation of a respective door assembly As a result, approximately three inches of insulation may be added to approximately sixty percent of available sidewall area for many boxcars. The present invention provides increased sidewall insulation thickness while at the same time providing for increased interior width of the cargo carrying capacity.

AAR regulations require insulated boxcars to have an insulation efficiency or UA (factor) of three hundred or lower for a sixty foot long boxcar. To achieve the required UA factor, four inches or more of insulation are typically required in the sidewall. Insulated boxcars formed in accordance with teachings of the present invention preferably include additional insulation in portions of each sidewall which are not used or associated with operation of the respective door assembly. Depending upon materials used to form an insulated boxcar in accordance with teachings of the present invention the associated UA rating may be between approximately 200 and 300.

For some applications, a composite box structure may be formed in accordance with teachings of the present invention with sidewall assemblies, endwall assemblies and a roof assembly having respective exterior surfaces formed from fiber reinforced plastic or any other suitable materials.

BRIEF DESCRIPTION OF THE DRAWINGS

For a more complete understanding of the present invention, and the advantages thereof, reference is now made to the following written description taken in conjunction with the accompanying drawings, in which:

FIG. 1 is a schematic drawing in elevation showing a side view of an insulated boxcar incorporating teachings of the present invention;

FIG. 2 is a schematic drawing in section with portions broken away showing a floor assembly, sidewall assemblies and endwall assemblies incorporating teachings of the present invention;

FIG. 4 is a schematic drawing in section with portions broken away taken along limes 4-4 of FIG. 2 showing one example of variations in thickness of sidewall assemblies incorporating teachings of the present invention;

FIG. 5 is a schematic drawing in section with portions broken away showing one example of joining a roof assembly with relatively thick portions of a sidewall assembly in accordance with teachings of the present invention;

FIG. 6 is a schematic drawing in section with portions broken away showing one example of joining a roof assembly with relatively thin portions of a sidewall assembly and components of a door assembly in accordance with teachings of the present invention;

DETAILED DESCRIPTION OF THE INVENTION

Figure 3:
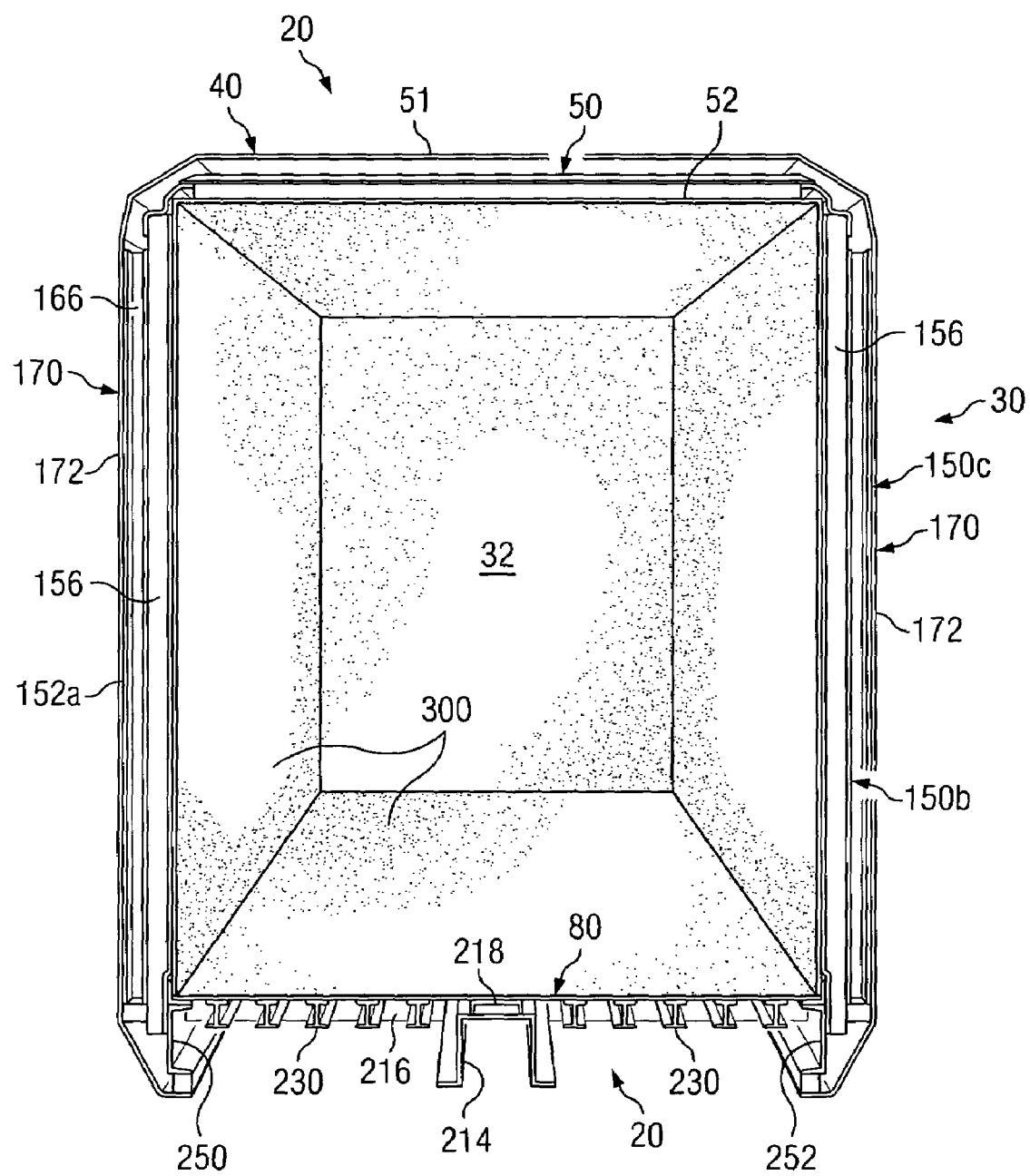
FIG. 3 is a schematic drawing in section with portions broken away showing one example of an insulating coating disposed on interior surfaces of an insulated boxcar incorporating teachings of the present invention.

Preferred embodiments of the invention and its advantages are best understood by reference to FIGS. 1–12 of the drawings, like numerals are used for like and corresponding parts in the various drawings.

The term "boxcar" often refers to a railway car having a generally elongated box type structure defined in part by a roof assembly, a floor assembly, a pair of sidewall assemblies, and a pair of endwall assemblies which cooperate with each other to define a generally hollow interior satisfactory for carrying various types of lading. The terms "boxcar" and "box car" may be used in this application to refer to both insulated and uninsulated boxcars.

The term "insulated boxcar" is used in this application to refer to a boxcar formed at least in part with insulating materials to minimize heat transfer through associated sidewall assemblies, endwall assemblies, roof and/or floor. Insulated boxcars do not generally include refrigeration systems or temperature control systems. The AAR has several different classes of insulated boxcars such as VM—partially insulated fruit, vegetable ventilated box; VS—insulated fruit, vegetable ventilated box and LRC—heavily insulated boxcar for solid carbon dioxide.

The terms "tie down assembly", "anchor" and "cargo anchor" may be used in this application to refer to any device, mechanism or assembly operable to secure lading at a desired location within a boxcar.

Various aspects of the present invention will be described with respect to insulated boxcar 20. However, the present invention is not limited to insulated boxcars. For example, some features of the present invention may be satisfactorily used to form uninsulated boxcars, temperature controlled railway cars, refrigerated boxcars and any other type of railway car having at least one sidewall assembly and a floor assembly mounted on a railway car underframe. A boxcar may be formed in accordance with teachings of the present invention to accommodate various geometric configurations and load carrying requirements to satisfy specific customer needs concerning size and temperature specifications for different types of lading. Examples of such lading include, but are not limited to, coiled steel, lumber, electronic equipment, automobile parts, household appliances, paper, paper products, household goods, nonperishable food products and any other product suitable for transport in a boxcar and does not require temperature control. Further examples of such lading include, but are not limited to, liquid filled containers, perishable food products (fresh, canned and packaged) and any other product suitable for transport in a boxcar and requires temperature control.

The present invention allows insulated boxcar 20 to have flexible loading capability to improve potential for carrying back-haul loads. Insulated boxcar 20 may be used to carry lading associated with both insulated and uninsulated boxcars and may sometimes be referred to as a "universal" boxcar. In the past, materials, configuration, size and components of conventional insulated boxcars often limited their ability to be effectively used to carry lading associated with uninsulated boxcars. To accommodate cargo that would typically be shipped using an uninsulated boxcar, insulated boxcar 20 includes metal interior surfaces, cargo anchors and a large interior volume equal to or greater than many uninsulated boxcars while meeting or exceeding requirements published by the AAR for insulated boxcars.

Insulated boxcar 20 incorporating teachings of the present invention is shown in FIG. 1 with box structure 30 mounted on railway car underframe 200. For some applications, insulated boxcar 20 may be modified to include a temperature control system (not expressly shown) and an airflow management system (not expressly shown). For embodiments of the invention as shown in FIGS. 1–11, insulated boxcar 20 may have a nominal length of sixty feet, exterior dimensions which satisfy the Association of American Railroads (AAR) Plate F clearance requirements and associated AAR design and heat transfer requirements. Insulated boxcar 20 is only one example of a universal boxcar which may be formed in accordance with teachings of the present invention.

Box structure 30 may be formed from various components including roof assembly 40, sidewall assemblies 150 and 152, floor assembly 80 and endwall assemblies 120 and 122. For some applications, roof assembly 40 may have a width of approximately nine feet. Forming various components of box structure 30 in accordance with teachings of the present invention on railway car underframe 200 may result in reducing the empty weight of insulated boxcar 20 while at the same time increasing both interior volume (interior height and width) and load carrying capacity as compared to many conventional insulated boxcars with the same AAR Plate F clearance and UA factor. For some applications insulated boxcar 20 may have the same or larger interior volume and load carrying capacity as compared to uninsulated boxcars satisfying AAR Plate F clearance requirements.

For embodiments of the present invention as shown in FIGS. 1–11 portions of railway car underframe 200 may be manufactured and assembled using conventional railcar manufacturing procedures and techniques. Railway car underframe 200 preferably includes a pair of railway car trucks 202 and 204 located proximate each end of railway car underframe 200. Standard railcar couplings 210 are also provided at each end of railway car underframe 200. Each coupling 210 preferably includes respective end of car cushioning unit 212 disposed at each end of center sill 214. Hand brake 208 may be mounted on one end of railway car underframe 200. Ladders 206 may be mounted on exterior portions of sidewall assemblies 150 and 152 adjacent to endwall assemblies 120 and 122. See FIGS. 1, 3, 4 and 11.

Railway car underframe 200 includes a pair of body bolsters (not expressly shown) with each body bolster disposed over respective railway trucks 202 and 204. The body bolsters may extend laterally from center sill 214. For some applications, each body bolster includes cover plates (not expressly shown) which extend over the wheels of railway car trucks 202 and 204. Railway car underframe 200 may include center sill 214, longitudinal stringers 230, cross bearers and/or cross ties 216, body bolsters and side sill assemblies 250 and 252 arranged in a generally rectangular configuration. Cross bearers 216 are attached to and extend laterally from center sill 214.

Figure 7:
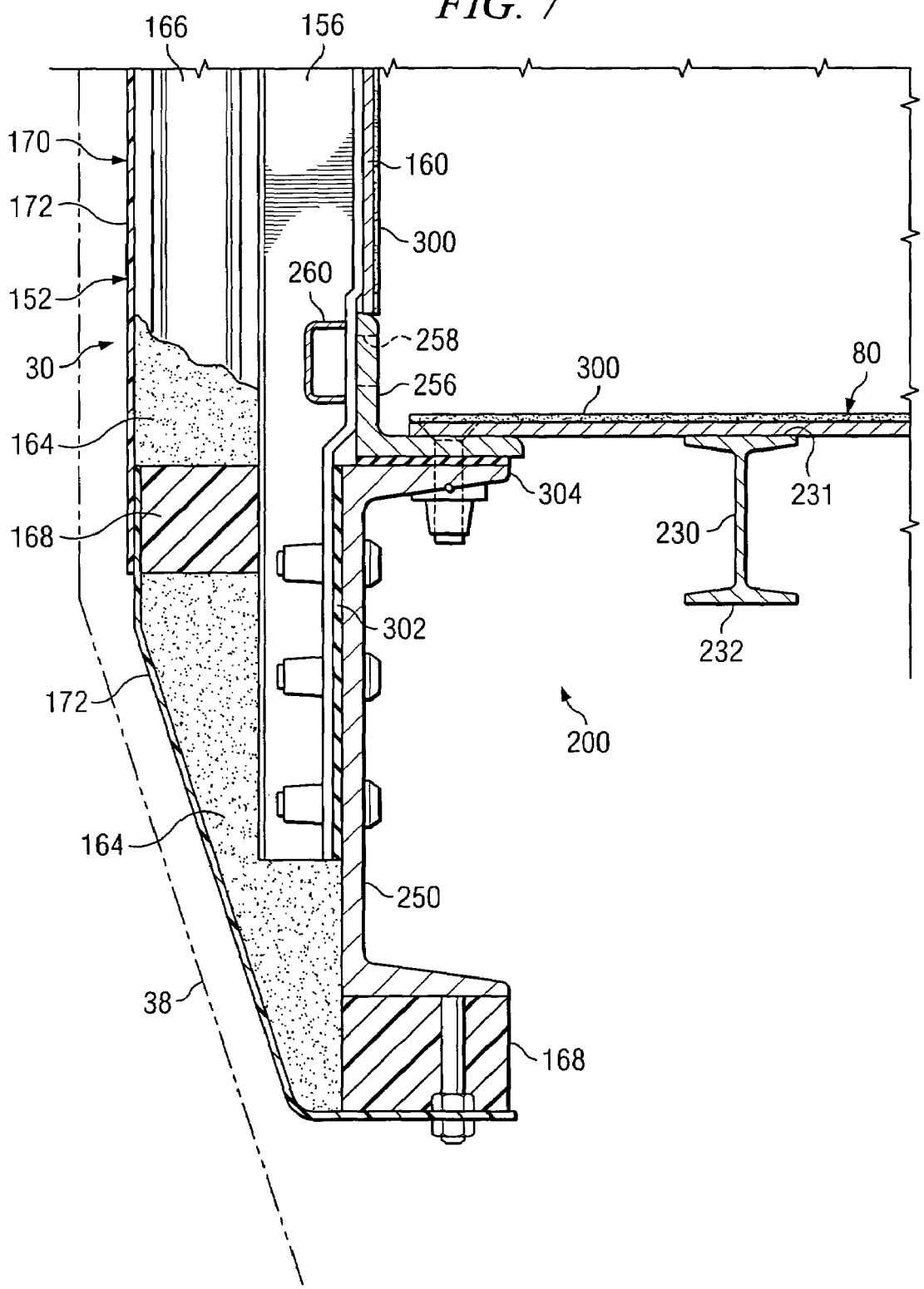
FIG. 7 is a schematic drawing in section with portions broken away showing one example of a floor assembly, a sidewall assembly and a side sill incorporating teachings of the present invention.

Railway car underframe 200 preferably includes a plurality of longitudinal stringers 230 which extend approximately the full length of railway car underframe 200 parallel with center sill 214. Longitudinal stringers 230 may be disposed on cross bearers 216, FIGS. 3, 4 and 7 show portions of floor assembly 80 disposed on longitudinal stringers 230 and respective portions of side sill assemblies 250 and 252. The number of cross bearers and/or cross ties 216, and longitudinal stringers 230 may be varied depending upon desired load carrying characteristics for the resulting insulated boxcar 20.

Each longitudinal stringer 230 preferably includes first surface 231 and second surface 232 which rests upon cross bearers 217 and cross ties 216. See FIG. 7. A selected portion of floor assembly 80 may be adhesively bonded or securely attached with portions of first surfaces 231 of longitudinal stringers 230.

Sidewall assemblies 150 and 152 may be fabricated with respective side sill assemblies 250 and 252 formed as integral components thereof. Endwall assemblies 120 and 122 may also be formed with all or at least portions of respective end sill assemblies (not expressly shown) formed as integral components thereof. Side sill assemblies 250 and 252 may have substantially the same overall configuration and dimensions. As shown in FIGS. 3, 4 and 7 side sill assemblies 250 and 252 may have a generally C shaped cross section.

Portions of the roof assembly 40, floor assembly 80, sidewall assemblies 150 and 152 and/or endwall assemblies 120 and 122 may be formed from conventional materials such as steel alloys and/or other metal alloys used to manufacture railway cars. Portions of the roof assembly 40, floor assembly 80, sidewall assemblies 150 and 152 and/or endwall assemblies 120 and 122 may also be formed with insulating materials such as urethane foam and polyvinyl chloride blocks. Closed cell urethane foams are often used in insulated boxcars. Examples of some materials which may be used to form an insulated boxcar incorporating teachings of the present invention are discussed throughout this application.

For some applications, roof assembly 40 may have an exterior layer 51 formed at least in part from fiber reinforced plastic and an interior layer 52 formed at least in part from fiber reinforced plastic. Various features associated with roof assembly 40 will be discussed later in more detail.

Various components associated with box structure 30 may be fabricated individually and then attached to or mounted on railway car underframe 200 to form insulated boxcar 20. Individually manufacturing or fabricating various components of box structure 30 may allow optimum use of conventional railcar manufacturing techniques. Alternatively, one or more of the components associated with box structure 30 may be fabricated and assembled on railway car underframe 200 to allow optimum use of conventional railcar manufacturing techniques.

As shown in FIGS. 1–4 the thickness of each sidewall assembly 150 and 152 may vary along the length of each sidewall assembly extending between endwall assembly 120 and endwall assembly 122. Conventional sidewall assemblies often have a generally symmetrical configuration with respect to each other and other components of an associated railway car. Sidewall assemblies formed in accordance with teachings of the present invention may have a nonsymmetrical configuration as a result of variations in thickness along the length of each sidewall assembly.

For embodiments of the present invention as shown in FIGS. 1–4 sidewall assembly 150 may include first portion 150*a*, second portion 150*b* and third portion 150*c*. Opening 154 may be formed between first portion 150*a* and 150*b*. Opening 154 is preferably sized to receive door assembly 180 which controls access to interior 32 of composite box structure 30. The size of opening 154 may be varied to accommodate a wide variety of loading and unloading requirements. For example, opening 154 may accommodate a door height of twelve feet four inches.

As discussed later in more detail first portion 150*a* and third portion 150*c* may have an increased thickness to accommodate additional insulation materials. Second portion 150*b* may have a reduced thickness to accommodate movement of associated door assembly 180 between its first, closed position as shown in FIG. 1, and a second, open position (not expressly shown). Sidewall assembly 152 may also include first portion 152*a* with an increased thickness, second portion 152*b* with a reduced thickness and third portion 152*c* with an increased thickness. As shown in FIG. 2 the arrangement of portions 152*a*, 152*b* and 152*c* is substantially reversed as compared with sidewall assembly 150.

Each sidewall assembly 150 and 152 may be formed with interior metal surfaces 162 and exterior surfaces or skin 172 of fiber reinforced plastic or other lightweight materials. Conventional insulating materials such as urethane foam 164 may be disposed between and bonded with the interior and exterior surfaces. Sidewall assemblies 150 and 152 may be formed from a plurality of support posts 156, interior layers formed from metal plates or metal sheets 160 and exterior layers 170 formed from fiber reinforced plastic (Fiberglass® for some applications) or any other suitable materials. Metal plates 160 cooperate with each other to provide interior surface 162 of each sidewall assembly 150 and 152. Exterior layers 170 cooperate with each other to form exterior surface 172 of each sidewall assembly 150 and 152.

Exterior layer 170 may be formed from various types of material such as thin sheets of fiber reinforced plastic or any other suitable materials. Exterior layer 170 provides a cover or protective sheath for insulation material 164. Respective beams 166 may be attached to the exterior surface or second surface of each support post 156 opposite from metal plates 160. For some applications beams 166 may be formed from polyvinyl chloride (PVC) type materials and may have the general cross section of an I beam. Beams 166 may also be formed from pultruded fiber reinforced plastics.

Figure 8:
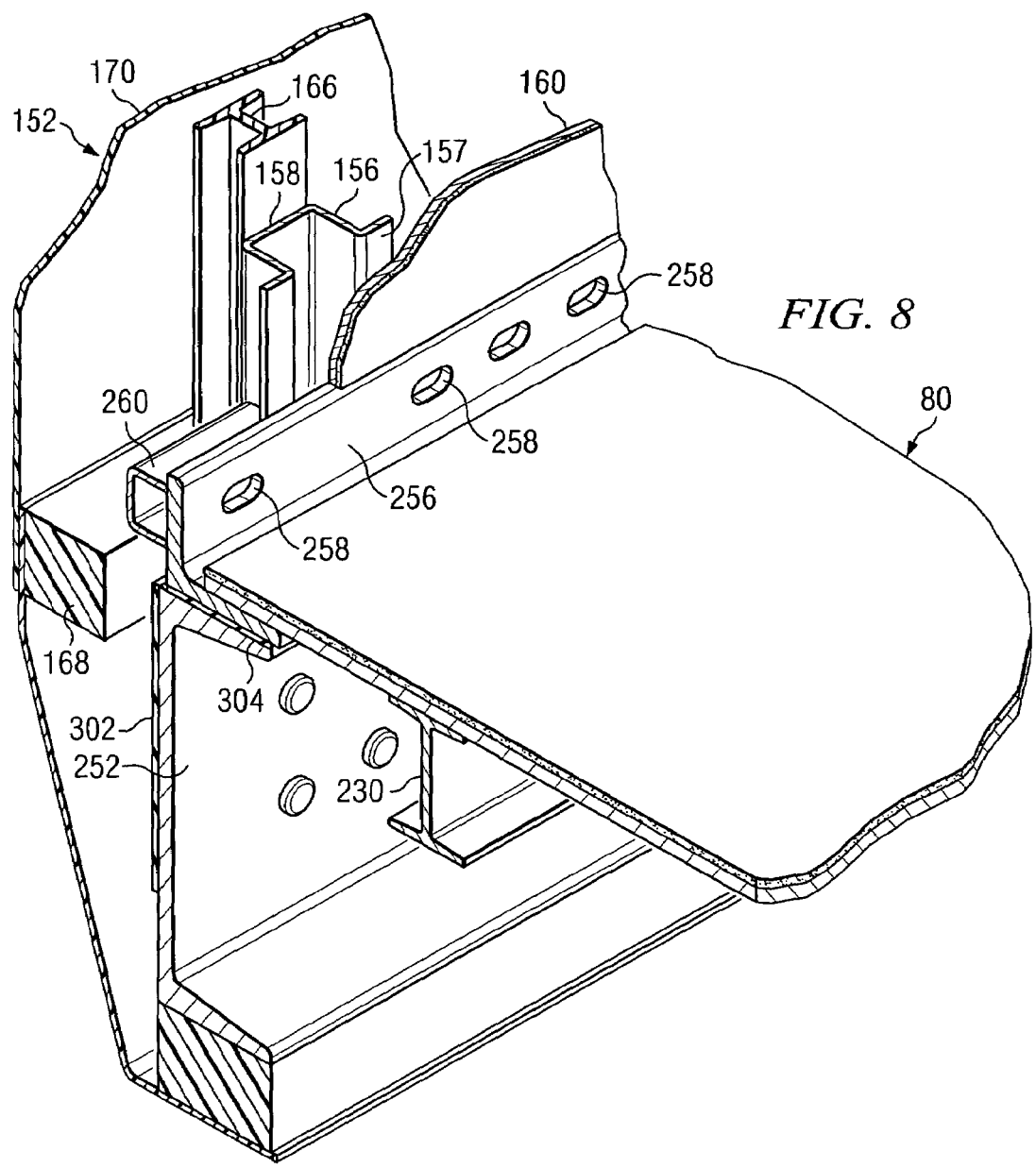
FIG. 8 is a schematic drawing showing an isometric view with portions broken away of a cargo anchor system disposed in a sidewall assembly in accordance with teachings of the present invention.

As shown in FIG. 8, metal plate or metal sheet 160 may be attached with the first surface or interior surface 157 of each support post 56. Respective beams 166 may be bonded with or attached to the second surface 158 of each support post 156. Fiber reinforced plastic layer 170 may then be bonded with each beam 166 opposite from respective support post 156. Urethane foam 164 may be injected or poured into void spaces defined in part by metal sheets 160, support post 156, beams 166 and layer 170. For some applications, blocks 168 may be disposed within each sidewall assembly to aid in maintaining at a desired location during solidification. See FIGS. 7 and 8.

For some application rolls of relatively thin Fiberglass® sheets may be used to form exterior layer 170 on each sidewall assembly 150 and 152. The thickness may vary from one eighth of an inch to one fourth of an inch. The respective layers of fiberglass may partially overlap each other to cover substantially the full length and height of each sidewall assembly 150 and 152. For some applications a pour type urethane foam may be injected into void spaces between metal sheets 160 and exterior layer 170. Pour foam may generally be injected faster into such void spaces and will generally cure faster as compared to other types of urethane foam.

Since pour foam often experiences higher pressures while curing, sidewall assemblies 150 and 152 and endwall assemblies 120 and 122 will generally be placed in appropriate fixtures (not expressly shown) during the curing process. After sidewall assemblies 150 and 152, endwall assemblies 120 and 122 and roof assembly 40 have been mounted on and attached to railway car underframe 200, froth foam may be added to or sprayed into and remaining void spaces. Froth foam may also be applied to various portions of railway car underframe 200 opposite from floor assembly 80. Pour type urethane foam may be obtained from various suppliers including, but not limited to, Carpenter Company. Froth foam may also be obtained from various suppliers including, but not limited to, Foam Supplies, Inc. For some applications, foam blocks or isolators may be used to attach exterior layer 170 with second surface or exterior surface of support posts 156. The foam blocks or isolators may be formed from various materials such as polyvinyl chloride. Urethane foam blocks may also be used.

Sidewall assemblies 150 and 152 preferably includes a plurality of metal side sheets 160 disposed on the interior thereof. Each side sheet 160 may include first surface 161 and second surface 162. First surface 161 of side sheets 160 cooperate with each other to form a portion of the interior surfaces of box structure 30. For one application side sheets 160 may be formed from twelve (12) gauge steel. See FIGS. 5B and 8.

A plurality of side stakes or support posts 156 are preferably attached to second surface 162 of each side sheet 160. Each side stake 156 may include first surface 157 and second surface 158. First surface 157 of each side stake 156 may project toward interior 32 of box structure 30. For some applications, isolators or beams 166 formed from an insulating material such as polyvinyl chloride (PVC) may be attached to second surface 158 of each support post 156. Exterior layer 170 may be bonded with isolators 166 opposite from support posts 156. Various types of blocks and/or strips of insulating materials may be satisfactorily used to couple exterior layer 170 with respective support post 156.

For some applications beams 166 may be formed from urethane foam. Placing isolators 166 between support post 156 and adjacent portions of exterior layer 170 provides sufficient structural strength for exterior layer and minimizes heat transfer through support post 156 between the interior and exterior of box structure 30. The present invention is not limited to use of PVC strips, PVC blocks, or any type of isolators.

The configuration and dimensions of sidewall assemblies 150 and 152 are preferably compatible with of AAR Clearance plate F represented by dotted lines 34, 36 and 38. Dotted lines 34 and 36 as shown in FIG. 2 represent applicable AAR clearance plate dimensions for boxcar 20.

Dotted lines 38 as shown in FIGS. 4–7 also represent applicable AAR clearance plate dimensions.

Respective support members 256 may be attached to interior surface 258 of each side sill assembly 250 and 252. Support members 256 may extend along substantially the full length of the respective side sill assemblies 250 and 252. For the embodiment of the present invention as shown in FIGS. 4 and 7 support members 256 may be formed from metal angles having desired dimensions compatible with railway car underframe 200 and floor assembly 80. Support members 256 may be welded with or otherwise securely attached with adjacent portions of side sill assemblies 250 and 252. Support members 256 form portions of respective connections or longitudinal joints between the lower portion of each sidewall assembly 150 and 152 and adjacent portions of floor assembly 80. See FIGS. 4 and 7.

For some applications froth foam may be injected into void spaces formed between roof assembly 40 and respective sidewall assemblies 152 and 150. See FIGS. 4–7. In FIG. 5 froth foam may be injected into void space 174 formed between roof assembly 40 and sidewall assembly 152. A pultruded and/or extruded strip of fiber reinforced plastic 176 may be used to cover void space 174. Portions of exterior layers 51 associated with roof assembly 40 preferably overlap or cover a portion of each extruded panel 176. In a similar manner a portion of each extruded panel 176 preferably overlaps respective layer 170 of sidewall assemblies 152 and 150.

Endwall assemblies 120 and 122 may be formed using similar materials and techniques as previously described with respect to sidewall assemblies 150 and 152. For sidewall assemblies 150 and 152, support posts 156 extend generally vertically between respective side sill assemblies 250 and 252 and roof assembly 40 (see FIGS. 3 and 4). Endwall assemblies 120 and 122 may be formed with end beams 126 having an I-beam configuration. However, end beams 126 disposed within endwall assemblies 120 and 122 extend generally horizontally with respect to each other and railway car underframe 200. Each endwall assembly 120 and 122 preferably includes a respective top chord or top plate 134 attached with upper portions of adjacent metal sheets 124. See FIGS. 10A and 10B.

Metal sheets 124 may be attached to first surface 126a of each end beam 126. Metal sheets 124 of endwall assemblies 120 and 122 may also be referred to as "end sheets." Respective isolators 128 formed from insulating materials may be attached to second surface 126b of each end beam 126. Exterior layers 130 formed from fiber reinforced plastic or other lightweight material may be attached to isolators 128 opposite from end beams 126. Exterior layers 130 cooperate with each other to form exterior surface 132 of each endwall assembly 120 and 122.

Foam insulation may be disposed between and bonded with adjacent portions of end beams 126, metal sheets 124 and adjacent portions of exterior layer 130. For one embodiment endwall assembly 120 may be preferably mounted on the first end or A end may be of railway car underframe 200. In a similar manner, endwall assembly 122 may be mounted on the second end or B end of railway car underframe 200.

As previously noted, roof assembly 40, sidewall assemblies 150 and 152, floor assembly 80, and endwall assemblies 120 and 122 may be fabricated as individual components. For some applications these components may be fabricated at the same facility. For other applications one or more components may be fabricated at a remotely located facility. Each component may be attached to railway car underframe 200 in accordance with teachings of the present invention.

For one embodiment sidewall assembly 150 is preferably mounted on one longitudinal edge of railway car underframe 200 with side sill assembly or bottom chord 250 disposed adjacent to associated ends of cross bearers or cross beams 216. In a similar manner sidewall assembly 152 may be mounted on an opposite longitudinal edge of railway car underframe 200 with side sill assembly or bottom chord 252 disposed adjacent to associated ends of cross bearers or cross beams 216. Various types of mechanical fasteners and/or welds may be formed between side sill assemblies 250 and 252 and the respective ends of cross bearers or cross beams 216. For some applications Huck type mechanical fasteners are preferably used to attach side sill assemblies 250 and 252 with the respective cross bearers and/or cross beams 216.

Sidewall assemblies 150 and 152 preferably include respective top chords 178. Top chords 178 generally extend longitudinally along the respective upper edge of sidewall assemblies 150 and 152. Each top chord 178 may have a cross section defined by a generally "W-shaped" portion with leg 179 extending therefrom. The upper portion of adjacent side sheets 160 may be attached with the W portion of each of the associated top chord 178. See FIGS. 5 and 6. Various techniques such as welding and/or mechanical fasteners may be used to attached metal sheets 160 with adjacent portions of top chords 178.

Roof assembly 40 may be formed with a generally elongated, rectangular configuration. The length and width of roof assembly 40 corresponds generally with the desired length and width of box structure 30. Roof assembly 40 includes first longitudinal edge 41 and second longitudinal edge 42 spaced from each other and extending generally parallel with each other from first lateral edge 43 to second lateral edge 44. First longitudinal edge 41 and second longitudinal edge 42 are preferably mounted on and attached with adjacent portions of respective sidewall assemblies 150 and 152. See FIGS. 5 and 6. Lateral edges 43 and 44 are preferably mounted on and attached with respective endwall assemblies 120 and 122. End wall assemblies may have a four inch flap 129 which folds over respective lateral edges 43 and 44. See FIGS. 10A and 10B.

Figure 12:
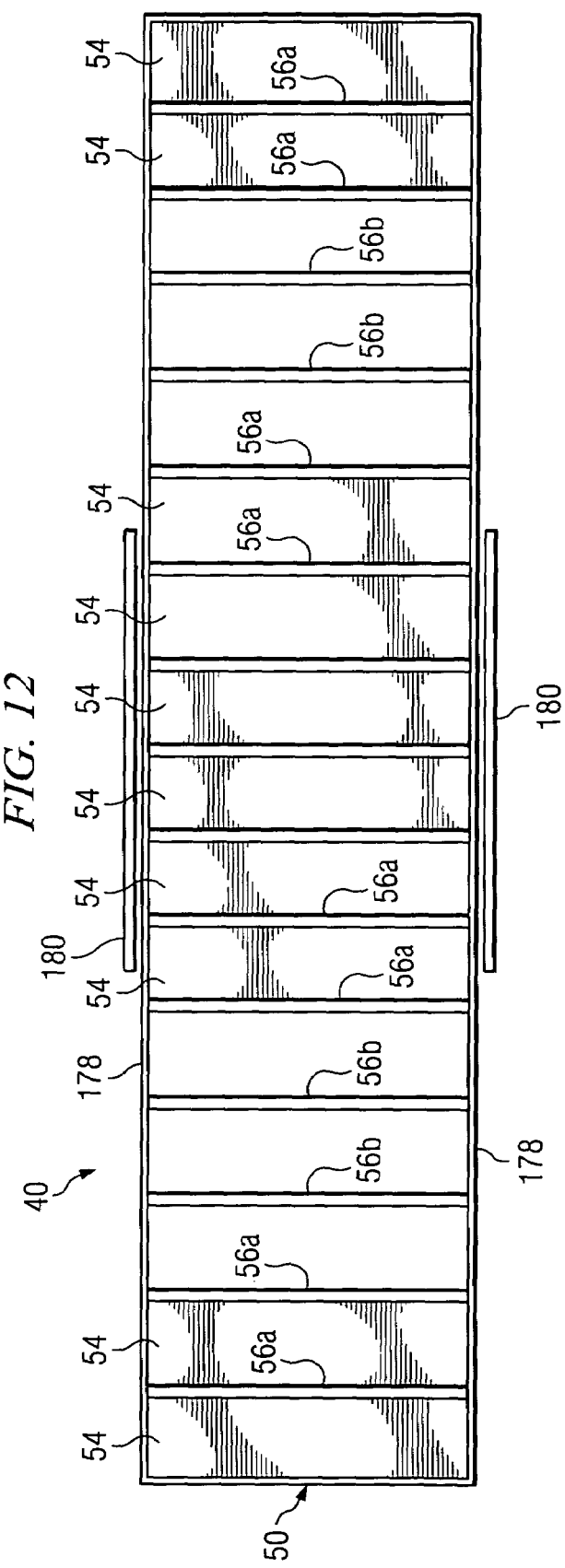
FIG. 12 is a schematic drawing with portions broken away showing a plan view of a roof assembly incorporating teachings of the present invention.

Various types of composite materials, insulating materials and metal alloys may be satisfactorily used to form roof assembly 40. For some applications roof assembly 40 may include septum or layer 50 disposed between exterior layer 51 and interior layer 52. See FIGS. 3, 5A, 6 and 12. Septum 50 of roof assembly 40 may include a plurality of metal sheets or metal plates 54 extending between and connected with respective top chords 178 associated with sidewall assemblies 150 and 152. For embodiments such as shown in FIG. 12, two metal sheets 54 may be disposed adjacent to each endwall assembly 120 and 122. Also, six metal sheets 54 may be disposed adjacent to the openings associated with door assemblies 180. These selected locations may correspond with generally high stress areas. Metal sheets 54 may act as plate girders to help stiffen composite box structure 30 with respect to racking and torsional loads. Metal plates 54 may be formed from fourteen (14) gauge steel sheets. For one application metal plates 54 may have approximate dimensions of three feet then inches by nine feet four inches.

A plurality of beams 56 may be disposed between and securely engaged with top chord 178 of sidewall assembly 150 and top chord 178 of sidewall assembly 152. Ends 58 of each beam 56 may be notched or otherwise configured for engagement with the associated top chord 178. See FIGS. 5A and 6. In addition to notches 58, generally triangular shaped gussets 59 may be attached to each end of beams 56. Gussets 59 may be formed from the same material as beams 56. Notches 58 and associated gussets 59 allow forming appropriate welds with adjacent top chords 176. Notches 58 also help to provides desired inside height while maintaining the desired door height and desired insulation thickness (at least four inches) for roof assembly 40.

Figure 11:
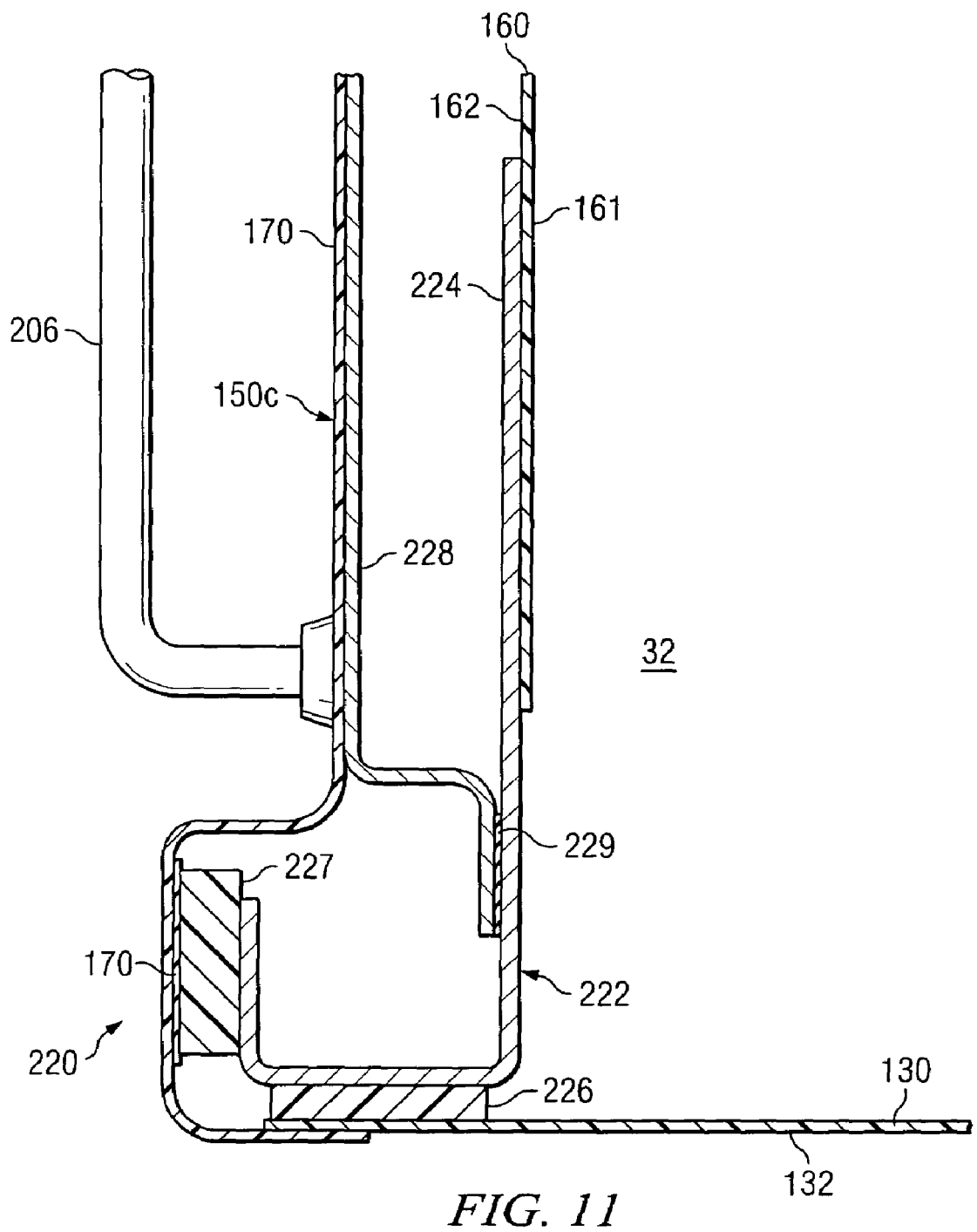
FIG. 11 is a schematic drawing in section with portions broken away showing a corner joint or corner connection formed between a sidewall assembly and an endwall assembly incorporating teachings of the present invention.

Various types of beams 56 may be used to form roof assembly 40. The configuration of beams 56 may vary along the length of roof assembly 40. For some applications beams 56a may have a generally hat shaped cross section to accommodate attachment of metal plates 54. For one application beams 56a may be formed from fourteen gauge steel with nine inch (9") flanges. For embodiments such as shown in FIG. 11, beams 56a may be disposed proximate each end of roof assembly 40 and adjacent to door assemblies 180. For some applications, beams 56 may be formed from hollow steel tubes. For one application beams 56 may have a generally square, three inch cross section. Beams 56 may be formed from steel alloys, aluminum alloys or any other material satisfactory for forming roof assembly 40.

For some applications, a plurality of blocks 62 may be disposed between support beams 56 and adjacent portions of exterior layer 52. Blocks 62 may be formed from PVC foam or other suitable insulating materials. Various types of adhesives (not expressly shown) may be used to attach blocks 62 with support beams 56 and exterior layer 51. A plurality of fiber reinforced pultrusions 64 may also be attached to exterior layer 51 and extend longitudinal along roof assembly 40. See FIGS. 5A and 6. Pultrusions 64 may have a generally hollow, square cross section of one inch by one inch with a wall thickness of approximately 0.1 inches. Pultrusions 64 help to reinforce exterior layer 52.

Interior layer 52 may be formed from graffiti resistant, pigmented fiber reinforced plastic. For some applications interior layer 52 may be formed from tough, lightweight, relatively rigid material having high impact resistance available from U.S. Liner Company, a division of American Made, Inc. under the trademark Bulitex®. Bulitex® material may be generally described as a ballistic grade composite scuff and wall liner.

Exterior layer 51 may be formed from white fiber reinforced plastic with an opaque UV coating. Various types of protective coating such as Armor-Tuff® may also be applied to layers 51 and 52. Urethane foam blocks (not expressly shown) may be disposed between beams 56 and layers 51 and 52. For one application, the foam blocks may be approximately four inches thick, nine feet long and sixty-one inches wide. Nine feet corresponds with the approximate width of roof assembly 40. Sixty-one inches corresponds with approximate spacing between support beams 56.

Roof assembly 40 may be attached to and/or bonded with respective top chords 178 of sidewall assemblies 150, 152 and top chords or top plates 134 of endwall assemblies 120 and 122. Insulating foam is preferably disposed within the joint or flexible connection formed between roof assembly 40 and adjacent portions of sidewall assembly 150. Trim molding may be bonded with adjacent portions of roof assembly 40 and sidewall assemblies 150 and 152.

Each sidewall assembly 150 and 152 preferably includes respective openings 154 with door assembly 180 attached thereto and slidably mounted thereon. See FIGS. 1 and 2. Each door assembly 180 has a first position blocking respective opening 154 to form a barrier between interior 32 and the exterior of box structure 30. Each door assembly 180 also has a second position which allows access to interior 32 of box structure 30 through respective opening 154. Various types of doors may be satisfactory used with box structure 30, including doors fabricated from steel and/or wood, or doors fabricated from composite materials. Door assembly 180 is preferably formed from materials with thermal insulation characteristics corresponding with the associated sidewall assembly 150 and 152. Each door assembly 180 is preferably mounted on respective sidewall assemblies 150 and 152 adjacent to respective portion 150b and 152b using conventional hardware such as operating pipes, operating mechanisms, rollers, locking bars, gears and cams associated with conventional railway boxcars. Such items may be obtained from several vendors including YSD Industries, Inc. (Youngstown Steel Door), and Pennsylvania Railcar.

Each door assembly 180 may be slidably mounted on upper track 194 and lower track 196 which are attached adjacent to respective openings 36. Door frame assembly 190 may include upper track 194 and portions of top chord 178. Upper track 194 is shown attached with adjacent portions of top chord 178. One or more layers 196 of sealing material may be disposed between upper track 194 and leg 179 of top chord 178. Various welding techniques and/or mechanical fasteners may be used as desired.

Door frame assembly 190 is preferably attached to the perimeter of each opening 154 formed in respective sidewall assemblies 150 and 152. Each door frame assembly 190 may include a pair of vertical door post assemblies 191 and door header or door retainer 192. Upper door track 194, lower door track 196, and a threshold (not expressly shown) may also be installed adjacent to each door frame assembly 190. Vertical door post assemblies 191 are attached with an secured to adjacent portions of sidewall assemblies 150 and 152. Door header 192 is disposed between and attached to vertical door post assemblies 191 at the top of each opening 36.

Metal plates (not expressly shown) and/or an elastomeric threshold may be disposed within the lower portion of each opening 154 adjacent to floor assembly 80. The metal plates and/or threshold may be formed from steel alloys, aluminum alloys, ceramic materials and/or composites of these materials.

A pair of elastomeric gaskets may be formed on the interior of each door port assembly 190 adjacent to the perimeter of the respective door assembly 180. See FIG. 9. The elastomeric gaskets preferably form contacts with two portions of door assembly 180 when the respective door 180 is in its first position. The elastomeric gaskets and portions of door frame assembly 190 cooperate with each other to minimize heat transfer between the interior and the exterior of box structure 30, when the respective door 180 is in its first, closed position. Door stops (not expressly shown) may be mounted on the exterior of each sidewall assembly 150 and 152 to limit movement of the associated door assembly 180 from its first position to its second position.

Various types of mechanical tie-down connections may be provided within interior 32 of box structure 30. The tie down assemblies and/or cargo anchor assemblies are preferably attached with portions of sidewall assemblies 150 and 152. Floor assembly 80 preferably has a generally smooth uniform surface without any tie down assemblies and/or cargo anchor assemblies. As shown in FIGS. 7 and 8 a plurality of openings 258 may be formed in each longitudinal member 256. A respective enclosure 260 may be bonded with and attached to respective support post 156. For some embodiments of the present invention such as shown in FIGS. 7 and 8, enclosures 260 have a generally U-shaped, hollow configuration. During clean out of box structure 30 enclosures 260 prevent water or other fluids coming in contact with the foam insulation disposed between exterior layer 170 and metal sheets 160. U.S. Pat. No. 6,494,651 entitled "Railcar Anchor and Load Snugger Arrangement" shows one example of load restraining anchor assemblies which may be releasably engaged with respective openings or holes 258 at desired locations within box structure 30.

Figure 9:
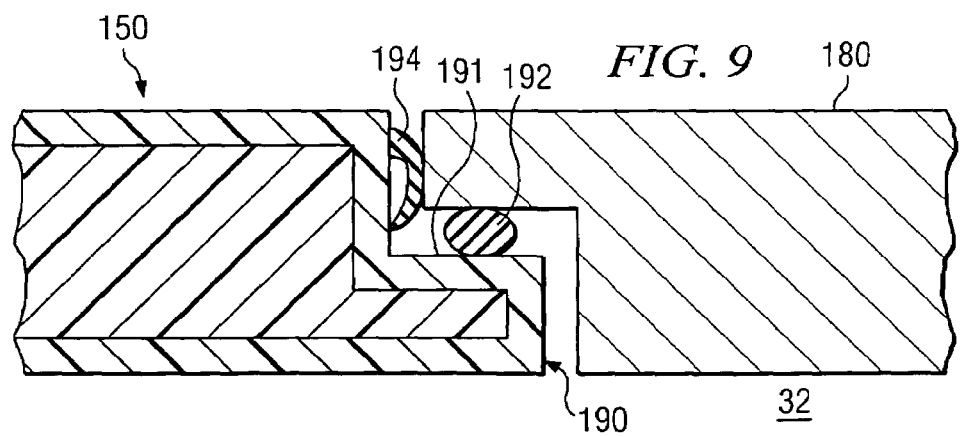
FIG. 9 is a schematic drawing in section with portions broken away showing one example a double seal assembly satisfactory for use with a insulated boxcar incorporating teachings of the present invention.
Figure 10:
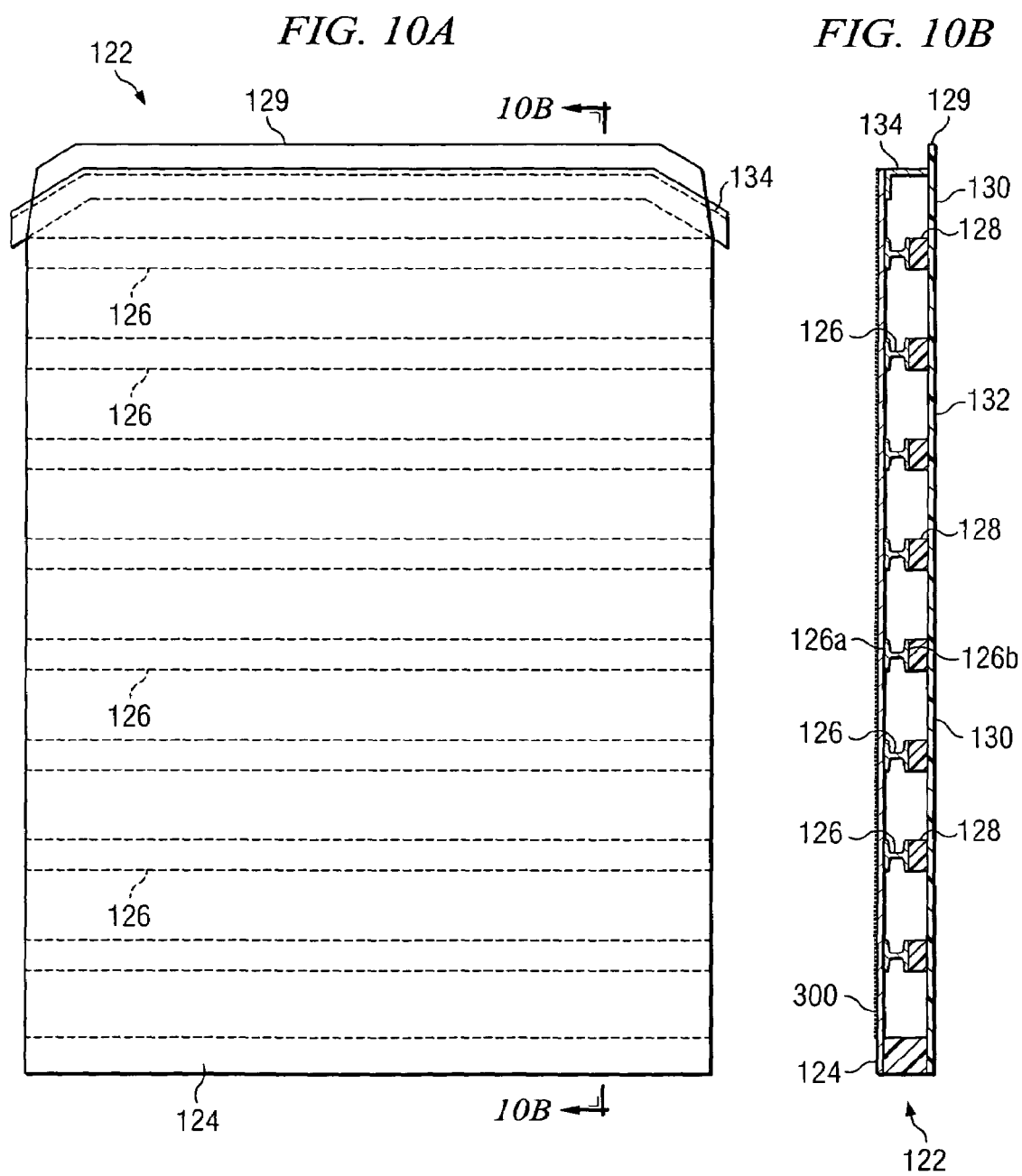
FIG. 10A is a schematic drawing in elevation with portions broken away showing an interior surface of an endwall assembly incorporating teachings of the present invention.
FIG. 10B is a schematic drawing in section taken along lines 10B—10B of FIG. 10A.

The door seal assembly shown in FIG. 9 may include a conventional door gasket or seal 192. An additional door gasket or seal 194 having the general configuration of a "sharks tooth" may also be provided. For some applications conventional door gasket or seal 192 may be permanently attached with adjacent portions of door assembly 190. Additional door gasket 194 may be permanently attached with adjacent portions of vertical support post 191. However, the location and arrangements of door gaskets and seals 192 and 194 may be buried as desired for each type of insulated boxcar.

For some applications foam blocks or wood blocks 168 may be disposed beneath each side sill assembly 250 and 252 for use in maintaining insulating foam at a desired location while during fabrication of the respective sidewall assembly 150 and 152. FIGS. 7 and 8 show examples of blocks 168 formed from wood or PVC type materials which may be satisfactorily used when injecting insulating foam into these areas.

Hucks and other types of mechanical fasteners such as shown in FIGS. 7 and 8 may be satisfactorily used to attach support posts 156 with adjacent portions of side sill assemblies 250 and 252. Various types of isolators including, but not limited to, fiber reinforced plastic pultrusions may be installed at mechanical connections between sidewall assemblies 150 and 152 and adjacent portions of railway car underframe 200 to reduce thermal leakage. Such isolators may also be installed between endwall assemblies 120 and 122 and adjacent portions of railway car underframe 200 and between floor assembly 80 and adjacent portions of railway car underframe 200. Isolator 302 disposed between adjacent portions of support posts 156 and respective side sill assembly 250 and isolator 304 disposed between floor assembly 80 and side sill assembly 250 are representative examples. Isolators 302 and 304 may be formed from various types of materials such as fiber reinforced plastic, PVC type material or any other satisfactory insulating material with both required strength and heat transfer characteristics to provide desired UA factor for box structure 30.

For some applications, a corner joint or corner connection such as shown in FIG. 11 may be formed between the ends of each sidewall assembly and adjacent portions of an associated endwall assembly. Corner joint or corner connection 220 as shown in FIG. 11 may include a respective corner post 222 formed from a metal plate. Various metal alloys such as aluminum and/or steel may be used to form corner post 220. For some applications, corner post 222 may have a generally open, J-shaped or L-shaped cross section defined in part by extended leg 224. Isolator 226 may be disposed on the exterior of corner post 222 between fiber reinforced plastic layer 130 of an associated endwall assembly 120 or 122. Isolators 227 may also be disposed on the exterior of each corner post 222 between adjacent portions of fiber reinforced plastic layer 170. For some applications, fiber reinforced layer 170 may overlap portions of fiber reinforced layer 130. One or more support plates 228 may be attached with support post 222 to accommodate attachment of ladder 206. For embodiments such as shown in FIG. 11, one or more isolators 229 may be disposed between support plate 228 and adjacent portions of corner post 222.

For some applications, a metal angle (not expressly shown) may be attached with the lower portion or bottom portion of each endwall assembly 120 and 122 opposite from respective top chord 134. The angle may also be described as an end sill used to attach respective endwall assembly 120 and 122 with adjacent portions of railway car underframe 200. One leg of the angle (not expressly shown) may be welded with adjacent portions of metal sheets 124 proximate the lower portion or bottom of each sidewall assembly 120 and 122. The other leg of the end sill may be attached with adjacent portions of side sill assemblies 150 and 152 and end sill 214 and associated ends of longitudinal stringers 230. As shown in FIG. 3, channel 218 may be disposed between floor assembly 80 and adjacent portions of center sill 214. Each end sill may also be disposed on channel 218 at the respective ends of railway car underframe 200.

Portions of the interior of insulated boxcar 20 may be insulated using various microsphere infused coatings such as a ceramic/epoxy coating. This material accommodates design considerations required of an insulated boxcar, due to its performance characteristics. By mixing microspheres into an epoxy paint system, the resulting material is lightweight, has a relatively high compressive strength, strong corrosion resistance and the durability necessary in severe (e.g., hot and/or cold) loading and/or unloading environments. Such characteristics make is possible to construct an insulated boxcar without a traditional wood interior.

A layer of insulating coating 300 may be placed on interior portions of floor assembly 40, sidewall assemblies 150 and 152, endwall assemblies 120 and 122 and roof assembly 80. See FIG. 3. For some applications, insulating coating 300 may have a thickness of approximately one-fourth of an inch or greater on interior surface 42 of floor assembly 80. See FIG. 7. For some applications, insulating coating 300 may have a ceramic microsphere density of approximately 40% to 60%. The thickness of the coating 300 on interior surfaces 162 of sidewall assemblies 150 and 152 and interior surfaces 124 of each endwall assembly 120 and 122 may be approximately 0.020 inches. For some applications, fiber reinforced plastic strands may also be placed within insulating coating 300. Such coatings are available from International Coatings.

Various coatings having microspheres infused therein may be used to coat interior surfaces of box structure 30. For some applications, an epoxy based coating having ceramic microspheres mixed throughout are applied at various locations on the interior of box structure 30. Many different types of microspheres are available. The present invention is not limited to ceramic microspheres. The ceramic microspheres may have a size approximately equal to that of a single grain of flour (slightly thicker than an human hair). The wall thickness of each microsphere may be approximately one-tenth of the sphere diameter. Microspheres may be provided that have strengths within a magnitude of 6,500 to 60,000 psi, a softening point of approximately 1,800 degrees centigrade, resistance to chemical degradation, and relatively low thermal conductivity of approximately 0.1 W/m/Celsius degree. Such ceramic microspheres may be non-toxic and non-combustible.

The microspheres generally have a hollow center. Most or all gasses may be removed from the center in an effort to create or mimic a vacuum. According to the laws of physics, nothing can move by conduction through a vacuum, since there is little to no matter present. Accordingly, microspheres that include a vacuum or approximate a vacuum at their centers are excellent insulators. Microspheres may be combined with a base material to form a coating with improved thermal resistance. For example, ceramic microsphere may be combined with a latex material to form a ceramic/latex coating or combined with an epoxy to form a ceramic/epoxy coating.

When applied to interior surfaces of box structure 30, ceramic microspheres may shrink down tight as water and other additives evaporate, creating a tightly packed array of cells (e.g., microspheres). This ceramic layer may provide a thermal barrier, improve fire resistance, protection from UV rays, repulsion of insects, and/or protection from destructive forces of weather. The ceramic cells may also increase longevity of the coating, which provides for less repair and/or maintenance of the insulated boxcar. Coatings and materials containing ceramic microspheres have excellent insulating capability. Such materials may be applied at strategic places in box structures 30 to help insulated boxcar 20 satisfy AAR heat transfer ratings while using a relatively small amount of space (e.g., thickness).

One example of a universal boxcar formed in accordance with teachings of the present invention may have the following features:

286,000 lb. Gross Rail Load;
Standard car equipped with two 8'-0" wide by 12'-4" high insulated plug doors;
optional 15" end-of-car cushioning unit;
Meets AAR Plate "F" Clearance Diagram;
Optional wireless monitoring system;
Ceramic/epoxy coating on interior surfaces;
Conventional urethane foam insulation;
Durable, wood free interior materials; and
Lightweight nonmetallic exterior surfaces.

| | |
|---|---|
| Length Inside | 60'-9" |
| Length Over Coupler Pulling Faces | 69'-¾" |
| Length over Strikers | 64'-8¾" |
| Length Between Truck Centers | 46'-3" |
| Truck Wheel Base | 5'-10" |
| Width, Extreme | 10'-6⅝" |
| Width, Inside | 9'-6" |
| Height, Extreme | 16"-11⅞" |
| Height Inside at Center Line of Car | 12'-10¾" |
| Estimated Lightweight | 89,000 lbs. |
| Estimated Load Limit - Based on 286,000 lbs. Gross Rail Load | 97,000 lbs. |
| Gross Rail Load | 286,000 lbs. |
| Cubic Capacity (Between bulkheads) | 7,442 cubic feet |
| Cubic Capacity (Level with height of sides) | 7,442 cubic feet |

Although the present invention and its advantages have been described in detail, it should be understood that various changes, substitutions and alternations can be made herein without departing from the spirit and scope of the invention as defined by the following claims.

What is claimed is:

1. An insulated boxcar comprising:
a pair of sidewall assemblies mounted on a railway car underframe;
each sidewall assembly having an exterior surface formed by a layer of fiber reinforced plastic material and an interior metal surface formed by a plurality of metal sheets;
urethane foam disposed between and bonded with the layer of fiber reinforced plastic material and the metal sheets;
each sidewall assembly having a plurality of metal support posts attached to a side sill assembly;
the metal sheets attached to respective first surfaces of the metal support posts;
a beam formed from nonmetallic material attached to respective second surfaces of at least a portion of the metal support posts opposite from the metal sheets; and
the layer of fiber reinforce plastic attached with the nonmetallic beams opposite from the associated metal support post.

2. The insulated boxcar of claim 1 wherein each sidewall assembly comprise at least a first portion having a reduced wall thickness and a second portion having an increased wall thickness.

3. An insulated boxcar having a nominal length of sixty feet comprising:
a box structure mounted on a railway car underframe;
the box structure having an interior width of approximately nine feet six inches;
the box structure having a UA rating of less than 300 BTU/° F./hour;
a first sidewall assembly and a second sidewall assembly;
each sidewall assembly having a first portion with a first thickness and a second portion with a second thickness;
the first thickness of each sidewall assembly greater than the second thickness of each sidewall assembly;
each sidewall assembly having an opening with a respective door slidably disposed on the exterior of the sidewall assembly;
and each door having a first, closed position which blocks access to the interior of the box structure;
each door having a second, open position which allows access to the interior of the box structure; and
the second thickness of each sidewall assembly corresponding with portions of the sidewall assembly covered by the door in its second open position.

4. A insulated boxcar comprising:
a railway car underframe having a floor assembly mounted thereon and attached thereto;
the railway car underframe and the floor assembly having generally elongated, rectangular configurations;
a pair of sidewall assemblies mounted on and attached to opposite sides of the railway car underframe;
a pair of endwall assemblies mounted on and attached to opposite ends of the railway car underframe;
a roof assembly attached to the sidewall assemblies and the endwall assemblies opposite from the floor assembly;
each sidewall assembly having an interior surface formed from a plurality of metal sheets extending between a respective top chord and a respective side sill assembly;
the metal sheets having respective first surfaces and second surfaces;
a plurality of support posts respectively attached to the first surfaces of the metal sheets;
the second surfaces of the metal sheets corresponding with the interior surface of each sidewall assembly;
each sidewall assembly formed from a plurality of fiber reinforced panels attached to and extending between the respective top chord and the respective side sill assembly;
the fiber reinforced panels having respective first surfaces and second surfaces;
the plurality of support posts respectively attached to the second surfaces of the fiber reinforced panels;

the first surfaces of the fiber reinforced panels corresponding with an exterior surface of each sidewall assembly; and foam insulation disposed between and bonded with respective first surfaces of the metal sheets, portions of the support posts and respective second surfaces of the fiber reinforced panels.

5. The insulated boxcar of claim 4 further comprising:

each sidewall assembly having an opening formed therein to provide access to the interior of the insulated boxcar;

a respective door slidably disposed on each sidewall assembly for movement between a first position blocking access through the respective opening and a second position allowing access through the respective opening to the interior of the insulated boxcar;

each sidewall assembly having a first wall thickness and a second portion having a second wall thickness which is greater than the thickness of the first wall section;

the location of the first portion of each sidewall assembly corresponding approximately with the location of the door when the door is in its second, open position;

the first portion of each sidewall assembly having a first thickness of insulation and the second portion of the sidewall assembly having a second thickness of insulation which is less than the thickness of the insulation of the first sidewall assembly.

6. The insulated boxcar of claim 4 further comprising:

each sidewall assembly having a first portion, a second portion and a third portion;

the first portion and the third portion having approximately the same wall thickness;

the second portion having a wall thickness less than the thickness of the first and third portions;

the thickness of the first wall portion and the second wall portion plus the inside width of the insulated boxcar approximately equal to the maximum allowable width of the appropriate AAR clearance plate; and the difference in thickness between the second portion and the third portion approximately equal to the thickness of the associated door.

7. The insulated boxcar of claim 4 further comprising a plurality of insulators disposed between selected components of each sidewall assembly and an associated side sill to improve heat transfer ratings of the associated box structure.

8. The insulated boxcar of claim 4 further comprising:

a floor assembly mounted on a railway car underframe;

the sidewall assemblies respectively attached with opposite sides of the floor assembly;

cargo anchors disposed within each sidewall assembly; and no cargo anchors disposed within the floor assembly to improve heat transfer ratings of the associated box structure.

9. The insulated boxcar of claim 4 further comprising:

a floor assembly mounted on a railway car underframe;

the sidewall assemblies respectively attached with opposite sides of the floor assembly;

cargo anchors disposed within each sidewall assembly;

no cargo anchors disposed within the floor assembly; and the floor assembly having a generally smooth, uniform surface satisfactory for carrying lading selected from the group consisting of paper rolls, paper products and other lading which may be damaged by cargo anchors associated with conventional floor assemblies.

10. An insulated boxcar comprising:

a railway car underframe having a generally rectangular configuration defined in part by a plurality of cross bearer, cross ties and longitudinal stringers for mounting the composite box structure thereon;

a pair of substantially rectangular sidewall assemblies mounted on and secured with opposite sides of the railway car underframe;

each sidewall assembly having a top chord attached to and extending along an upper edge and a side sill assembly attached to and extending along a lower edge;

an opening formed in each sidewall assembly to provide access to an interior of the composite box structure for loading and unloading lading;

a pair of substantially rectangular endwall assemblies mounted on and secured with opposite ends of the railway car underframe;

each endwall assembly having a top plate attached to and extending along a upper edge and at least a portion of an end sill assembly attached to and extending along a lower edge;

the endwall assemblies and the sidewall assemblies joined with each other at respective corner joints;

a substantially rectangular floor assembly mounted on the railway car underframe;

the floor assembly extending between and joined with portions of the sidewall assemblies and portions of endwall assemblies adjacent to the railway car underframe;

a substantially rectangular roof assembly mounted on and attached to the top chord of each sidewall assembly and the top plate of each endwall assembly;

each sidewall assembly having an interior metal surface formed by a plurality of metal sheets extending between the respective top chord and side sill assembly;

each endwall assembly having an interior metal surface formed by a plurality of metal sheets attached to the respective top plate and the portion of the end sill assembly;

each sidewall assembly having an exterior surface formed by a plurality of layers of fiber reinforced plastic;

each endwall assembly having an exterior surface formed by at least one layer of fiber reinforced plastic;

insulating material respectively disposed between and bonded with the metal sheets and adjacent layers of fiber reinforced plastic used to form the respective sidewall assemblies; and insulating material respectively disposed between and bonded with the interior surfaces of the metal sheets and the layers of fiber reinforced plastic used to form the endwall assemblies.

11. The insulated boxcar of claim 10 further comprising:

each sidewall assembly having an opening formed therein to allow access with an interior of the boxcar;

a respective door assembly sliding mounted on each sidewall assembly;

each door assembly having a first, closed position blocking access through the opening in the respective sidewall assembly;

each door assembly having a second, open position allowing access through the opening in the respective sidewall assembly;

a respective seal assembly disposed within the opening in each sidewall assembly; and each seal assembly having a first seal and a second seal operable to engage the respective door assembly when the door assembly is in its first, closed position.

12. The insulated boxcar of claim 11 further comprising at least one seal of each seal assembly having a cross section of a shark tooth.

13. The insulated boxcar of claim 11 further comprising:
components of each door assembly disposed on the exterior of the respective sidewall assembly extending outwardly to approximately a maximum width compatible with an applicable AAR Clearance plate;
portions of each sidewall assembly having a first width and a second width with the first width larger than the second width;
portions of each sidewall assembly with the first width having increased insulation thickness and improved heat transfer characteristics as compared to portions of the sidewall assembly having the second width; and
the second position of each door assembly corresponding generally with portions of the respective sidewall assembly having the second width.

14. The insulated boxcar of claim 10 further comprising the first portion of each sidewall assembly having approximately three inches of increased insulation thickness as compared with thickness of insulation associated with the second portion of each sidewall assembly.

15. The insulated boxcar of claim 10 further comprising:
the first portion of each sidewall assembly corresponding with approximately sixty percent of the total area of the sidewall assembly; and
the second portion of each sidewall assembly corresponding with approximately forty percent of the total sidewall assembly area.

16. An insulated boxcar comprising:
a pair of sidewall assemblies and a pair of endwall assemblies mounted on a railway car underframe;
insulating material disposed within each sidewall assembly and each endwall assembly;
each sidewall assembly having an interior surface formed from a plurality of metal sheets and a plurality of metal support posts;
the insulating material associated with each sidewall assembly bonded with the metal sheets opposite from the respective interior surface;
a nominal length of sixty feet;
a UA rating of less than 300 BTU/° F./hour; and
an interior width of approximately nine feet six inches.

* * * * *